No. 635,049. Patented Oct. 17, 1899.
L. LOOK.
JAR CLOSER OR OPENER.
(Application filed June 14, 1898.)
(No Model.)
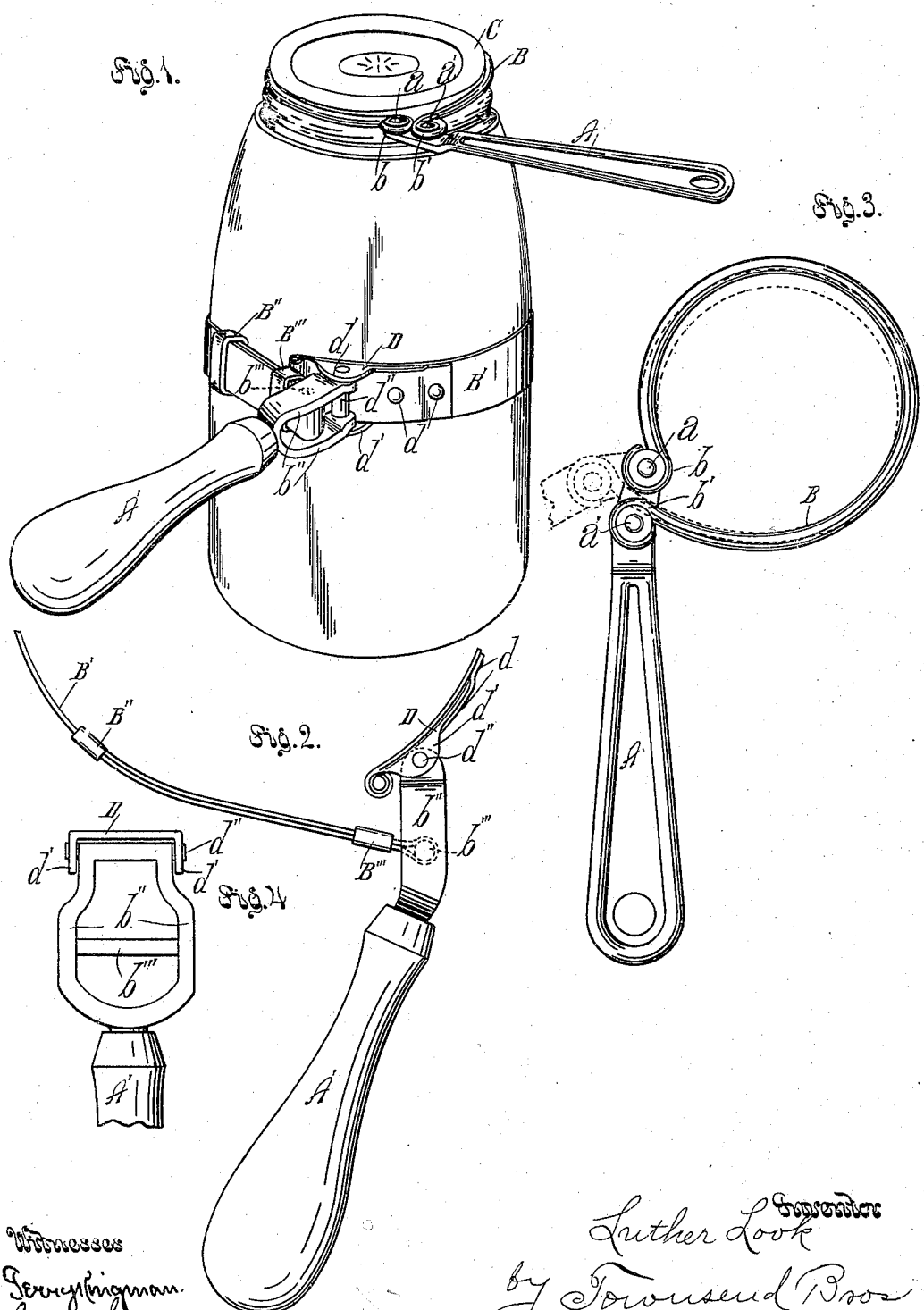

UNITED STATES PATENT OFFICE.

LUTHER LOOK, OF LOS ANGELES, CALIFORNIA.

JAR CLOSER OR OPENER.

SPECIFICATION forming part of Letters Patent No. 635,049, dated October 17, 1899.

Application filed June 14, 1898. Serial No. 683,417. (No model.)

*To all whom it may concern:*

Be it known that I, LUTHER LOOK, a citizen of the United States, residing at Los Angeles, in the county of Los Angeles and State of California, have invented new and useful Improvements in Jar Closers or Openers, of which the following is a specification.

The object of my invention is to produce a device which will be adapted for closing and opening fruit-jars with great facility, and one which will grip the jar and the cover without danger of breaking the jar or mashing the cover, but so tightly that there will be no possibility of slipping, even though great force is exerted in screwing the cover fully home.

My invention comprises the various features of construction and combinations of parts whereby I am enabled to provide a device of this kind which is very neat, cheap, and simple in construction, convenient in application, and highly effective in use.

The accompanying drawings illustrate my invention.

Figure 1 is a perspective view of a jar, showing my invention applied thereto for the purpose of screwing the cover home. Fig. 2 is a fragmental plan view of the device for holding the jar. Fig. 3 is a plan view of the device for gripping the cover. Fig. 4 is a side elevation of the lever portion of the jar-gripping device.

In the drawings, A represents a lever, and B represents a loop, which in the device used upon the cover C of the jar is preferably made of spring-wire and has its ends $b\ b'$ attached to the lever, preferably by pivots $a\ a'$, which are arranged at a distance from each other. One pivot, $a'$, is arranged at a distance from the inner end of the lever and substantially in line with the axis of the lever, and the other pivot, $a$, is arranged at the extreme end of the lever and at the rear of the extended axis of the main body of the lever, so that when the lever is swung to clamp the loop upon the jar-cover the pressure of the end of the lever is not so crushing in its effects as it would be were both pivots arranged in line with the axis of the lever, since the ends of the loop are by this arrangement drawn past each other, and since the loop is made of strong wire the pressure is almost evenly distributed around the entire circumference of the loop. This loop has a normal tendency to spring open and to thereby throw the handle into the position shown in Figs. 1 and 3, so that it can be easily slipped into place upon the can-cover; but when the handle is swung to the left, as shown in dotted lines in Fig. 3, the diameter of the band is thereby lessened and it is caused to grip tightly upon the can-cover.

The wire loop B is shaped as shown in Fig. 3, and when not in operation remains in that position. As it is held by the resiliency of the spring the operation of the lever A to clamp the can-cover first overcomes this resiliency and then exerts itself upon the cover. When the pressure is released from the lever, the resiliency of the spring draws the lever backward and releases the grip.

The loop B′ for gripping the can is for cheapness preferably made of canvas or other flexible material, and in order to provide simple and effective means for securing the loop to the lever A′, I provide a pivot-plate D, which is secured to one end of the loop by means of rivets $d$ and is provided with ears $d'$, through which is passed a pivot-pin $d''$, by which the handle B′ is pivoted to the plate. The lever is bifurcated and its two arms $b''$ are provided with a cross bar or pin $b'''$, arranged at a distance from the pivot $d''$ and around which the other end of the canvas strap is looped and returned upon itself, as shown in Fig. 2. The strap is provided at its end with a band B″, which slides upon the main body of the loop, and a second band B‴ is provided to slip close up to the pivot-pin $b'''$ and to thereby prevent the strap from accidentally slipping. The end of the strap is arranged upon the inside of the loop, so that when pressure is applied to tighten the loop the end of the strap is firmly gripped between the loop and the can and is thereby prevented from slipping.

It will be observed that I have shown the loop B′ so adjusted that the ends of the loop do not pass each other as they do in the device for gripping the can-cover. There are two reasons for this. One reason is that not only is the jar larger in circumference than the lid, but the strap is also much wider than the wire loop, and therefore the frictional surface is much greater, and, secondly, after the outer pivot $a'$ passes a radial line drawn from the center of the cover and passing through the pivot $a$ the leverage increases so rapidly that if this arrangement was used in connection with a flexible strap encircling a glass jar the powerful leverage obtained might crush the walls of the jar at the point where the plate D engages therewith. By reversing this construction, as the loop B is tightened the leverage constantly decreases and can be so regulated as to enable the operator to grip the can firmly, but with no danger of crushing it.

In practice to use my device the loop of the jar-holder is slipped down into position encircling the can, as shown in Fig. 1, and is held in place by the operator grasping the lever with one hand, while with the other hand he places the loop of the closer in position encircling the top of the can, as shown in Fig. 1. Then the two handles are carried toward each other, the upper handle being operated to overcome the spring resistance of the loop B, and the loop is thus clamped tightly about the can-top, while the loop B' of the jar-holder is clamped tightly about the jar and the top can be screwed home as tightly as is desired.

When it is desired to open the can, the devices are reversed to thereby unscrew the top instead of to screw it on, and the operation is repeated in the reverse manner.

Now, having described my invention, what I claim as new, and desire to secure by Letters Patent, is—

1. In a jar closer and opener, the combination set forth of a lever; a spring-metal loop adapted to encircle a jar or its cover, having one end pivotally secured to the lever at one end thereof and having its other end secured to the lever at a distance from such end, the loop being adapted to normally spring open.

2. In a jar closer and opener, the combination set forth of a lever; a spring-metal loop adapted to encircle a jar-cover and having one end secured to a pivot arranged at one end of the lever, and having its other end secured to a pivot at a distance from the end of the lever, the first-named pivot being arranged at the rear of a line passing through the axis of the handle and the other pivot.

LUTHER LOOK.

Witnesses:
ALFRED I. TOWNSEND,
JAMES R. TOWNSEND.